United States Patent
Muchherla et al.

(10) Patent No.: US 11,556,267 B2
(45) Date of Patent: Jan. 17, 2023

(54) DATA MANAGEMENT DURING A COPYBACK OPERATION

(71) Applicant: Micron Technology, Inc., Boise, ID (US)

(72) Inventors: Kishore K. Muchherla, Fremont, CA (US); Niccolo' Righetti, Boise, ID (US); Jeffrey S. McNeil, Jr., Nampa, ID (US); Akira Goda, Setagaya (JP); Todd A. Marquart, Boise, ID (US); Mark A. Helm, Santa Cruz, CA (US); Gil Golov, Backnang (DE); Jeremy Binfet, Boise, ID (US); Carmine Miccoli, Boise, ID (US); Giuseppina Puzzilli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 45 days.

(21) Appl. No.: 17/006,978

(22) Filed: Aug. 31, 2020

(65) Prior Publication Data

US 2022/0066642 A1 Mar. 3, 2022

(51) Int. Cl.
*G06F 3/06* (2006.01)

(52) U.S. Cl.
CPC ............ *G06F 3/065* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,572,335 B2 | 10/2013 | Wakrat et al. | |
| 8,849,104 B2 | 9/2014 | Eder et al. | |
| 10,274,948 B2 | 4/2019 | Penilla et al. | |
| 2006/0156189 A1* | 7/2006 | Tomlin | G06F 12/0246 714/763 |
| 2009/0193058 A1* | 7/2009 | Reid | G06F 11/1068 |
| 2011/0161784 A1* | 6/2011 | Selinger | G06F 11/1016 714/E11.002 |
| 2012/0233387 A1* | 9/2012 | Wakrat | G06F 11/1068 711/E12.008 |
| 2012/0324277 A1* | 12/2012 | Weston-Lewis | G11C 16/105 714/6.11 |
| 2013/0145234 A1* | 6/2013 | Yoon | G11C 29/52 714/773 |
| 2017/0372431 A1 | 12/2017 | Perl | |
| 2018/0341413 A1* | 11/2018 | Lai | G06F 3/0647 |

* cited by examiner

*Primary Examiner* — Jason W Blust
(74) *Attorney, Agent, or Firm* — Brooks, Cameron & Huebsch (57) ABSTRACT

A method includes performing a copyback operation comprising transferring, using an internal processing device, user data and header data corresponding to the user data from a first block of memory in a memory device to a register in the memory device, decoupling the user data from the header data, performing an error correction code (ECC) operation on updated header data using an external processing device, transferring, via the external processing device, the updated header data to the register, and transferring the user data and the updated header data from the register to a second block of memory in the memory device.

16 Claims, 7 Drawing Sheets

DATA MANAGEMENT DURING A COPYBACK OPERATION

TECHNICAL FIELD

Embodiments of the disclosure relate generally to memory systems, and more specifically, relate to data management during a copyback operation.

BACKGROUND

A memory system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to data management during a copyback operation. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices, such as memory devices that store data. The host system can provide data to be stored at the memory sub-system and can request data to be retrieved from the memory sub-system.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information can be part of metadata for the host data.

A memory system may store units of data that each consist of header data and user data. The header data may be time-variant data, such as the temperature at which the data is written and block and page version numbers (sequence numbers), that may change over time in the header information. The user data may be time-invariant data whose values do not change over time (e.g., unless overwritten with updated user data). During a copyback operation, the header and the user data are written from one block (e.g., a source block) of memory in a memory device (e.g., NAND memory device) to another block (e.g., a destination block) of memory in the memory device. As the header data is moved from one block of memory to another block of memory at a different point in time, the time-variant data may change. Traditional memory systems may error encode the header data along with the user data using error correction code (ECC) encoding. These traditional memory systems may not be able to overwrite the header data alone during the copyback operation.

The memory system described above may be implemented into autonomous vehicles, for example. With the advent of autonomous vehicles, L5 autonomous driving requires real time buffering of telemetric data such as video cameras, RADAR, LIDAR, ultra-sonic and other sensors is necessary to playback the sequences preceding an accident. The data may include user data and header data corresponding to user data. The user data may include data from various sensors that sum up to a range of approximately half (0.5) of a GigaByte per second (GB/sec) to one and a half (1.5) GB/sec sequential write throughput from a host. Upon an event, a range of approximately fifteen (15) seconds to forty five (45) seconds of playback time immediately preceding an event needs to be captured to determine the cause of an incident. The playback can be referred to as a "snapshot". As used herein, the term "snapshot" may refer to data that is moved from a source block of memory to a destination block of memory based on a determination that an event has occurred. A copyback operation may be used to transfer the user data, including the playback data, from a cyclic partition buffer to a snapshot partition.

An event recorder (e.g., black box) can use copyback operations to move data between different blocks of memory in autonomous vehicles. As used herein, the term "copyback" may refer to an operation that moves data from a source block within a memory device to a destination block within the memory device without transferring the data to an processing device external to the memory device and/or without performing an error correction code (ECC) operation on the data. In various instances, a memory device (e.g., NAND device) may not include on-die ECC circuitry such that the memory device is incapable of performing ECC operations on data in association with performing copyback operations. If ECC operations are not performed on the data during a copyback operation, the data retains any errors in the data (e.g., header data and user data) when the data is moved to the destination location within a memory device.

Aspects of the present disclosure address data management while a snapshot is being stored (e.g., moved from a source location to a destination location) via a copyback operation. The copyback operation may be performed while the snapshot is being transferred from a cyclic buffer partition to the snapshot partition. Embodiments described herein account for time-variant data, such as the temperature at which the data is written, as well as block and page version numbers that may change when the data is being written to a new block.

More specifically, aspects of the present disclosure solve the issue of not being able to update header data during a copyback operation by decoupling the header data from the user data during the copyback operation. Decoupling the header data from the user data allows the memory system to manage the header data separately from the user data. In some embodiments, during a copyback operation, user data and header data is transferred from a source block of memory to a register. While in the register, the header data may be decoupled from the user data, discarded, and replaced with updated header data received from a memory sub-system controller and/or host processor, for example. In some embodiments, the updated header data is ECC encoded before it is sent to the register and in other embodiments the updated header data is ECC encoded after it is sent to the register. The user data and updated header data may be transferred from the register to a destination block of memory. In this manner, the time variant header data can be updated and ECC encoded independently from the time invariant user data to which it corresponds in association with copyback operations.

The figures herein follow a numbering convention in which the first digit or digits correspond to the drawing figure number and the remaining digits identify an element or component in the drawing. Similar elements or components between different figures may be identified by the use of similar digits. For example, 103 may reference element "03" in FIG. 1, and a similar element may be referenced as 203 in FIG. 2. Analogous elements within a Figure may be referenced with a hyphen and extra numeral or letter. See, for example, elements 540-0, . . . , 540-S in FIG. 5. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
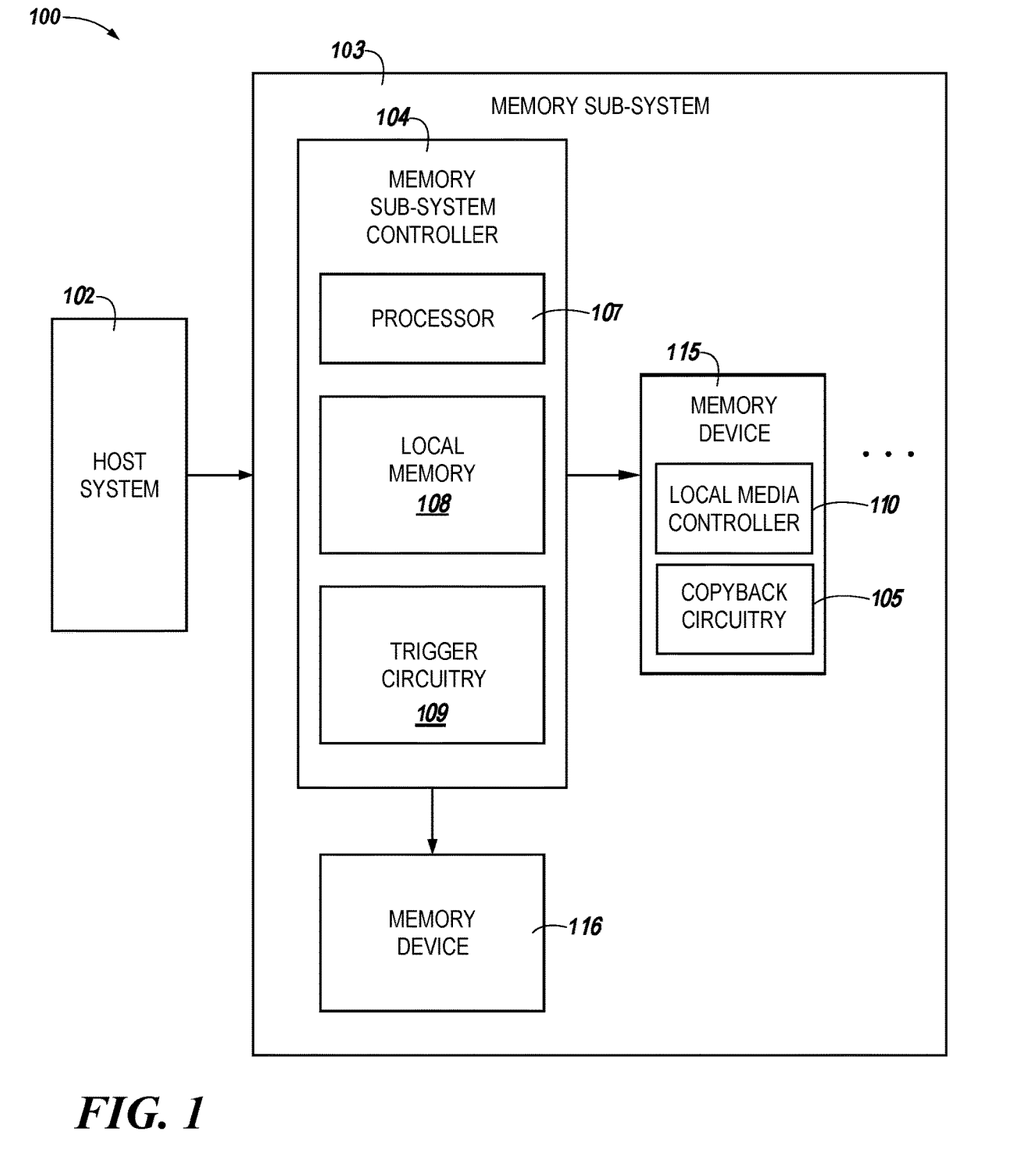
FIG. 1 illustrates an example computing system that includes a memory sub-system in accordance with some embodiments of the present disclosure.

FIG. 1 illustrates an example computing system 100 that includes a memory sub-system 103 in accordance with some embodiments of the present disclosure. The memory sub-system 103 can include media, such as one or more volatile memory devices (e.g., memory device 116), one or more non-volatile memory devices (e.g., memory device 115), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory sub-systems 103. In some embodiments, the host system 102 is coupled to different types of memory sub-systems 103. FIG. 1 illustrates an example of a host system 102 coupled to one memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, etc.). The host system 102 uses the memory sub-system 103, for example, to write data to the memory sub-system 103 and read data from the memory sub-system 103.

The host system 102 can be coupled to the memory sub-system 103 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 103. The host system 102 can further utilize an NVM Express (NVMe) interface to access the memory component (e.g., memory device 115) when the memory sub-system 103 is coupled with the host system 102 by the PCIe interface. The physical host interface can provide an interface for passing control, address, data, and other signals between the memory sub-system 103 and the host system 102. FIG. 1 illustrates a memory sub-system 103 as an example. In general, the host system 102 can access multiple memory sub-systems via a same communication connection, multiple separate communication connections, and/or a combination of communication connections.

The memory devices 115, 116 can include any combination of the different types of non-volatile memory device 115 and/or volatile memory devices 116. The volatile memory devices (e.g., memory device 116) can be, but are not limited to, random access memory (RAM), such as dynamic random access memory (DRAM) and synchronous dynamic random access memory (SDRAM).

Some examples of non-volatile memory devices (e.g., memory device 115) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 115, 116 can include one or more arrays of memory cells. One type of memory cell, for example, single level cells (SLC) can store one bit per cell. Other types of memory cells, such as multi-level cells (MLCs) storing 2 bits per cell, triple level cells (TLCs) storing 3 bits per cell, quad-level cells (QLCs) storing 4 bits per cell, and penta-level cells (PLCs) storing 5 bits per cell, can store multiple bits per cell. In some embodiments, each of the memory devices 115, 116 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the memory devices 115, 116 can be grouped as pages that can refer to a logical unit of the memory device used to store data. With some types of memory (e.g., NAND), pages can be grouped to form blocks.

Although the non-volatile memory device 115 such as a 3D cross-point array of non-volatile memory cells and NAND type memory (e.g., 2D NAND, 3D NAND) and 3D cross-point array of non-volatile memory cells are described, the memory device 115 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 104 (or controller 104 for simplicity) can communicate with the memory device 115 to perform operations such as reading data, writing data, or erasing data at the memory device 115 and other such operations. The memory sub-system controller 104 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 104 can be a microcontroller, special purpose logic circuitry (e.g., a field programmable gate array (FPGA), an application specific integrated circuit (ASIC), etc.), or other suitable processors.

The memory sub-system controller 104 can be an external processing device, which includes one or more processing devices 107 (e.g., processor) configured to execute instructions stored in local memory 108. As used herein, the term "external processing device" can refer to a memory sub-system device or a host device that is external to a memory device. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code, for example. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive information (e.g., sensor information) or operations from the host system 102 and can convert the information or operations into instructions or appropriate information to achieve the desired access to the memory device 115 and/or the memory device 116. The memory sub-system controller 104 can be responsible for other operations such as wear leveling operations, garbage collection operations, error detection and error correction code (ECC) operations, encryption operations, caching operations, and address translations between a logical address (e.g., logical block address (LBA), namespace) and a physical address (e.g., physical block address) that are associated with the memory devices 115, 116. The memory sub-system controller 104 can further include host interface circuitry to communicate with the host system 102 via the physical host interface. The host interface circuitry can convert the information (e.g., sensor information) received from the host system into command instructions to access the memory device 115 and/or the memory device 116 as well as convert responses associated with the memory device 115 and/or the memory device 116 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory device 115 and/or memory device 116.

In some embodiments, the memory sub-system controller 104 includes at least a portion of the trigger circuitry 109. For example, the memory sub-system controller 104 can include an external processing device 107 configured to execute instructions stored in local memory 108 for performing the operations described herein. In some embodiments, the trigger circuitry 109 is part of the host system 102, an application, or an operating system.

In some embodiments, the memory device 115 includes a local media controller 110 that operates in conjunction with memory sub-system controller 104 to execute operations on one or more memory cells of the memory device 115. An external controller (e.g., memory sub-system controller 104) can externally manage the memory device 115 (e.g., perform media management operations on the memory device 115). In some embodiments, a memory device 115 is a managed memory device, which is a raw memory device combined with a local controller (e.g., local controller 110) for media management within the same memory device package. An example of a managed memory device is a managed NAND (MNAND) device.

As previously stated, the memory sub-system controller 104 can also include trigger circuitry 109. As used herein, the trigger circuitry 109 can comprise an ASIC configured to perform the examples described herein. The trigger circuitry 109 can handle information (e.g., sensor information) received in association with a particular event (e.g., a determination and/or detection of an accident associated with an autonomous vehicle). By way of example and not by way of limitation, a determination may be made when sensor information is equal to or above a particular threshold value. For example, the threshold value may be a predetermined value programmed at a time of manufacture, or the threshold value may be a value set by programming in a field of use after manufacture. The threshold value may be a value relating to a level of pressure indication from a braking sensor on an autonomous vehicle, a deceleration value received from a sensor, a magnitude and timing abruptness change to a steering sensor, and/or indications relating thereto, etc. The trigger circuitry 109 can provide a trigger event signal and provide the event information (e.g., sensor information) to the external processing device 107.

In some embodiments the system 100 can be an autonomous vehicle and the trigger event can be a mechanical stress above a threshold as detected by a sensor on the autonomous vehicle. The trigger circuitry 109 can signal the external processing device responsive, at least in part, based on a determination that a trigger event has occurred and the copyback operation is performed responsive to a determination that the trigger event has occurred. The trigger circuitry 109, in some embodiments, can cause the memory sub-system controller 104 and/or local media controller 110 to perform write actions (e.g., issue write commands) to control host data movement between one memory portion (e.g., cyclic buffer partition portion of a memory device) and the other memory portion (e.g., snapshot partition portion of a memory device) as described according to embodiments herein.

In some embodiments, a local media controller 110 of a memory device 116 includes at least a portion of the trigger circuitry 109. For example, the local media controller 110 can include a processor (e.g., processing device) configured to execute instructions stored on the memory device 116 for performing the operations described herein. In some embodiments, the trigger circuitry 109 is part of the host system 102, an application, or an operating system.

The trigger circuitry 109 can also track a quantity of information (e.g., sensor information) received from a particular event and by the memory sub-system 103. The trigger circuitry 109 can further track a quantity of write operations between one memory portion (e.g., cyclic buffer partition) and the other memory portion (e.g., snapshot partition) performed by the memory devices 115, 116 by each event. The trigger circuitry 109 can further limit the quantity of write operations between one memory portion (e.g., cyclic buffer partition) and the other memory portion (e.g., snapshot partition) performed by the memory devices 115, 116 for each event. If an event exhausts the amount of data that it writes and/or reads, then the trigger circuitry 109 can refrain from providing additional information (e.g., sensor information) received from the event to the external processing device 107 during a time period.

The local media controller 110 can also include copyback circuitry 105. The copyback circuitry 105 can be used to perform a copyback operations within memory device 115 to move data from the cyclic buffer partition and the snapshot partition, for example. In some embodiments, a copyback operation can be performed by the memory to move the data from the buffer memory portion (e.g., cyclic buffer partition portion 214-1 in FIG. 2) to the snapshot memory portion (e.g., snapshot partition portion 214-2 in FIG. 2) without transferring the data between the memory and the external controller (e.g., 104) and/or without performing an error correction operation on the data. Such an approach can reduce the amount of time and energy used to move the data from the buffer memory portion to the snapshot memory portion.

Figure 2:
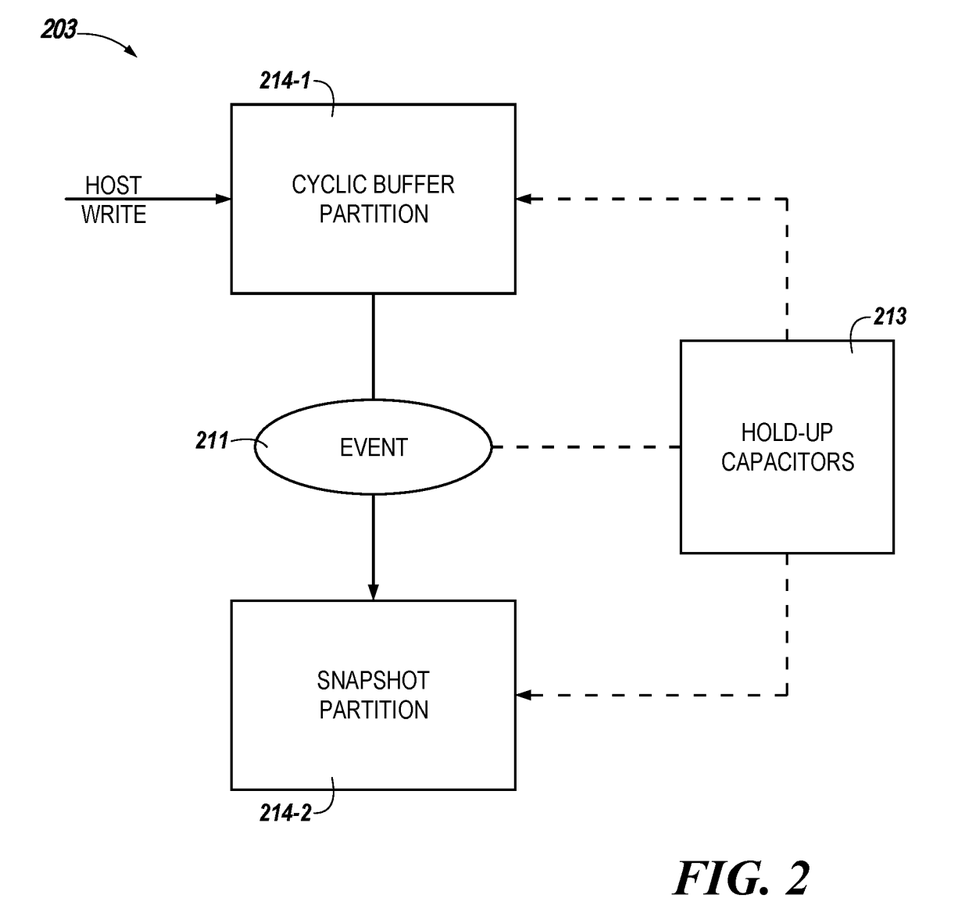
FIG. 2 illustrates an example of a separate partition for buffer and snapshot memory within a memory sub-system in accordance with some embodiments of the present disclosure.

FIG. 2 illustrates an example of a separate partition for buffer 214-1 and snapshot 214-2 memory within a memory sub-system 203 in accordance with some embodiments of the present disclosure. In one example, host information (e.g., data) can be received to the memory sub-system 203 at a rate of at least one (1) GigaByte per second (GB/sec.). The host data can be received to the memory sub-system 203 and stored first in sequence to a cyclic buffer partition portion 214-1 of the memory sub-system 203. In one example, the cyclic buffer partition portion 214-1 is sized so that only the last thirty (30) seconds of data is valid. In this example, at a 1 GB/sec. received data bandwidth, the cyclic buffer partition portion 214-1 can have a logical size of thirty (30) GigaBytes (GB). In some embodiments, an internal processing device can be configured to, based at least in part on a determination that a trigger event has occurred, perform the copyback operation to write at least 30 seconds of data from the cyclic buffer partition portion 214-1 to the snapshot partition portion 214-2, wherein the snapshot partition portion 214-2 has the size to store at least 8 different sets of at least 30 seconds of received data. As shown in the example of FIG. 2, a snapshot partition portion 214-2, of the memory sub-system 203 can be communicatively coupled to the cyclic buffer partition portion 214-1. According to embodiments, based at least in part on a determination that an event has occurred, received host data can be written from the cyclic buffer partition portion 214-1 to the snapshot partition portion 214-2. In some embodiments, the determination that the event has occurred can include actuation of a trigger signal 211 by trigger circuitry (e.g., trigger circuitry 109 in FIG. 1) based at least in part upon received sensor information from a host that is above a particular threshold (e.g., quantitative value). In some embodiments, the particular threshold can be a predetermined value programmed to the memory sub-system 203 during manufacture of the memory sub-system 203. In other embodiments, the particular threshold can be a value programmed to the memory sub-system 203 after manufacture of memory sub-system 203 (e.g., programmed to the memory sub-system 203 in the field of use).

In the example of FIG. 2, the memory sub-system 203 can write sets of data, sequentially received and stored in the cyclic buffer partition portion 214-1, from the cyclic buffer partition portion 214-1 to the snapshot partition portion 214-2 based at least in part on the determination that the event has occurred. In some embodiments, the data is not sequentially received. In some embodiments, the snapshot partition portion 214-2 of the memory sub-system 203 is sized to receive one or more sets of data from the cyclic buffer partition portion 214-1 (e.g., a set of host data being written from the cyclic buffer partition portion 214-1 to the snapshot partition portion 214-2 each time the determination is made that an event has occurred). In one example the snapshot partition portion 214-2 is sized to receive at least eight (8) sets of sequentially written data from the cyclic buffer partition portion 214-1. In this example, the snapshot partition portion 214-2 can have a logical size of two hundred and forty (240) GBs. As used herein, a logical size of the snapshot partition portion 214-2 is referred to as "a user capacity" of the memory sub-system.

As shown in the example of FIG. 2, the movement (e.g., writing) of sets of data, sequentially received and stored in the cyclic buffer partition portion 214-1, from the cyclic buffer partition portion 214-1 to the snapshot partition portion 214-2 based at least in part on the determination that the event has occurred, is powered by a non-volatile power supply 213 (e.g., a battery power supply such as hold-up capacitors). As shown in the example of FIG. 2, the power supply 213 is communicatively coupled to the cyclic buffer partition portion 214-1 and the snapshot partition portion 214-2 to supply power to the cyclic buffer partition portion 214-1 and the snapshot partition portion 214-2 of sufficient duration to write at least a set of data of a particular size (e.g., snapshot size) sequentially received and stored in the cyclic buffer partition portion 214-1, from the cyclic buffer partition portion 214-1 to the snapshot partition portion 214-2.

Thus, if a trigger event to write sets of data, sequentially received and stored in the cyclic buffer partition portion 214-1, from the cyclic buffer partition portion 214-1 to the snapshot partition portion 214-2 is received in connection with a power supply loss to the memory sub-system 215, then a least one set of data of a particular size (e.g., snapshot size) received and stored in the cyclic buffer partition portion 214-1, can be written from the cyclic buffer partition portion 214-1 to the snapshot partition portion 214-2. In one example, the particular size (e.g., snapshot size) is associated with a reliability of the cyclic buffer partition portion 214-1. The reliability of the cyclic buffer partition portion 214-1 can be thirty (30) seconds (e.g., a size of the cyclic buffer partition portion 214-1 (for host data received at a rate of 30 GB/sec)). In such an example, the power supply 213 communicatively coupled to the cyclic buffer partition portion 214-1 and the snapshot partition portion 214-2, is sized to provide a power supply of sufficient duration to the cyclic buffer partition portion 214-1 and the snapshot partition portion 214-2 to write the entire cyclic buffer partition portion 214-1 to the snapshot partition portion 214-2 upon an event that causes an external power supply loss to the memory sub-system 215.

In some embodiments the memory sub-system 215 includes a non-volatile memory device (e.g., a negative AND (NAND) memory device) and the cyclic buffer partition portion 214-1 and the snapshot partition portion 214-2 are included in the NAND memory device. In this example, the cyclic buffer partition portion 214-1 can be an array of non-volatile memory cells of a particular type and/or programmed according to a particular characteristic (e.g., single level cells (SLCs) in a particular programming mode of operation). The snapshot partition portion 214-2 can be an array of non-volatile memory cells of a particular type and/or programmed according to a particular characteristic (e.g., quad-level cells (QLCs) or other non-single level cells (NSLCs) in a particular programming mode of operation). According to embodiments, the cyclic buffer partition portion 214-1 has a first endurance characteristic and a first reliability characteristic and the snapshot partition portion 214-2 has a second endurance characteristic and a second reliability characteristic. In some embodiments, the first endurance characteristic can be greater than the second endurance characteristic and the first reliability characteristic can be less than the second reliability characteristic. In some embodiments, the endurance characteristic of the first endurance characteristic is an order of magnitude of at least six times (6×) greater than the second endurance characteristic. In some embodiments, operating the cyclic buffer partition portion 214-1 has a total bytes written (TBW) quantity capability which matches a lifetime system specification on an autonomous vehicle host. In some embodiments, the cyclic buffer partition portion 214-1 has a TBW quantity that is an order of magnitude of at least six times greater than a TBW quantity of the snapshot partition portion 214-2. In some embodiments, a ratio of a Total Bytes Written (TBW) quantity to the cyclic buffer partition portion 214-1 to a User Capacity (UC) storage size of the snapshot partition portion 214-2 is an order of magnitude in a range of 100× to 1000× greater than a TBW to UC storage size ratio in designs used for other applications.

Figure 3:
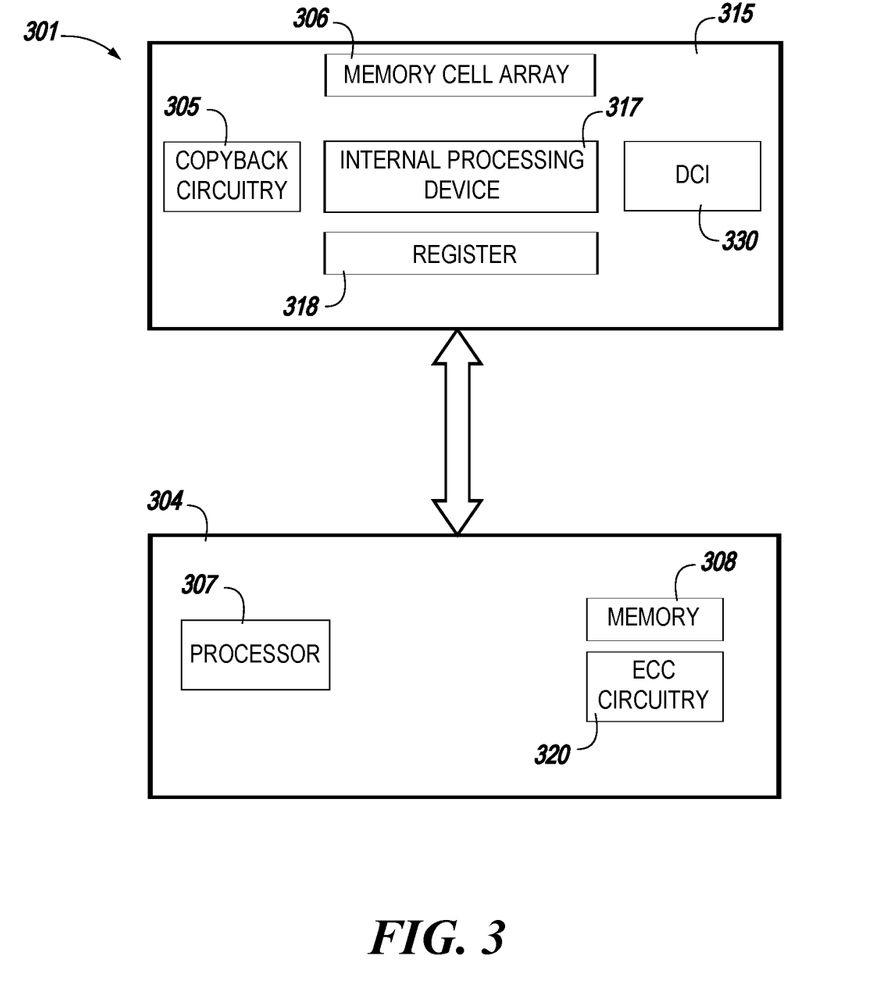
FIG. 3 is an example memory system for performing a copyback operation in accordance with some embodiments of the present disclosure.

FIG. 3 is an example memory system 301 for performing a copyback operation in accordance with some embodiments of the present disclosure. The system 301 can include a memory device 315 and a memory sub-system controller 304. The memory device 315 can include a memory cell array 306, an internal processing device 317, a data change indicator (DCI) 330, copyback circuitry 305, and a register 318. The memory device 315 can be a memory device such as device 115 shown in FIG. 1. The memory sub-system controller 304 can include a processor (e.g., controller) 307, a memory 308, and error correction code (ECC) circuitry 320. The controller 304 can be a controller such as controller 104 shown in FIG. 1.

The copyback circuitry 305 can be used to perform a copyback operation to move data from one block of memory (e.g., a source block) to a different block of memory (e.g., a destination block). For example, a copyback operation can be used to move data from a block in a cyclic buffer partition 214-1 to a block in a snapshot partition 214-2 as shown in FIG. 2. In some embodiments, the copyback operation can be performed to move data from a block of memory in the memory cell array 306 to a different block of memory in the memory cell array 306 without transferring the data to an external processing device such as the external processing device 307 of memory sub-system controller 304. For example, user data and corresponding header data can be transferred from a source block of memory in the memory cell array 306 to the register 318. The memory sub-system controller 304 may send updated header data to the internal memory device 315 during a copyback operation.

As described herein, in various embodiments, the header data can be decoupled from the user data to which it corresponds in association with performing a copyback operation. For instance, the internal processing device 317 can decouple the user data and the corresponding header data while the data is in the register 318. The memory sub-system controller 304 can send updated header data to the register 318. The internal processing device 317 can discard the header data and replace the header data with the updated header data received from the memory sub-system controller. The user data and the updated header data can be transferred from the register 318 to a destination block of memory within the memory cell array 306. In this embodiment, the memory device 315 can include ECC circuitry (not pictured) to perform an ECC operation on the updated header data to ECC encode the updated header data. The ECC operation may be performed on the updated header data but not the user data because the updated header data and the user data have separate ECC.

It can be beneficial to perform an ECC operation on the updated header data but not the user data because the updated header data includes time-variant data while the user data includes time-invariant data. Time-variant data may change over time, therefore; the time-variant data of the header data may change as the header data is being moved from the cyclic buffer partition portion to the snapshot partition portion. Performing an ECC operation on the header data to update the header data may allow accurate header data to be moved to the snapshot partition portion. Since the time-invariant user data does not change over time like the time-variant updated header data, performing an ECC operation on just the updated header data can reduce the time and energy required to perform a copyback operation in comparison to a copyback operation that performs an ECC operation on both the updated header data and the user data.

As previously stated, a copyback operation can be performed by moving data from a source block of memory in the memory device 315 to a destination block of memory in the memory device 315. For example, the internal processing device 317 can move the user data and header data from the source block of memory in memory cell array 306 to the register 318. The user data and the header data may be decoupled while in the register 318. The memory sub-system controller 304 may send updated header data to the register 318 and the internal processing device 317 may discard the previously received header data and replace the previously received header data with the updated header data. The updated header data and the user data may have separate ECC circuitry. In some embodiments, the memory device 315 may perform an ECC operation on the updated header data but not on the user data. The user data and updated header data can then be moved from the register 380 to the memory 306. In some embodiments, in response to receiving a read command from the memory sub-system controller 304, subsequent to performing the copyback operation, the memory device 315 can read the user data and corresponding updated header data from the destination block and provide the user data and corresponding updated header data to the memory sub-system controller 304 without performing an error correction operation on the user data or the corresponding updated header data. The memory sub-system controller 304 can decode the ECC encoded data received from the memory device 315.

Traditional memory sub-systems may ECC encode user data and header data together, as opposed to ECC encoding the user data and header data separately. In these embodiments, the header data and the corresponding user data may have the same ECC. Due to the ECC being shared between the user data and the header data, in these embodiments, a memory device (e.g., memory device 315) performs an ECC operation on both the user data and the header data. In embodiments described herein (e.g., as described in connection with FIG. 6), the user data and the header data may have separate ECC. Due to the user data and the header data having separate ECC, an ECC operation may be performed on the header data while not performing the ECC operation on the user data. For example, an ECC operation may be performed on updated header data while an ECC operation is not performed on corresponding user data. Further, an ECC operation can be performed on the user data while an ECC operation is not performed on the header data.

Figure 4:
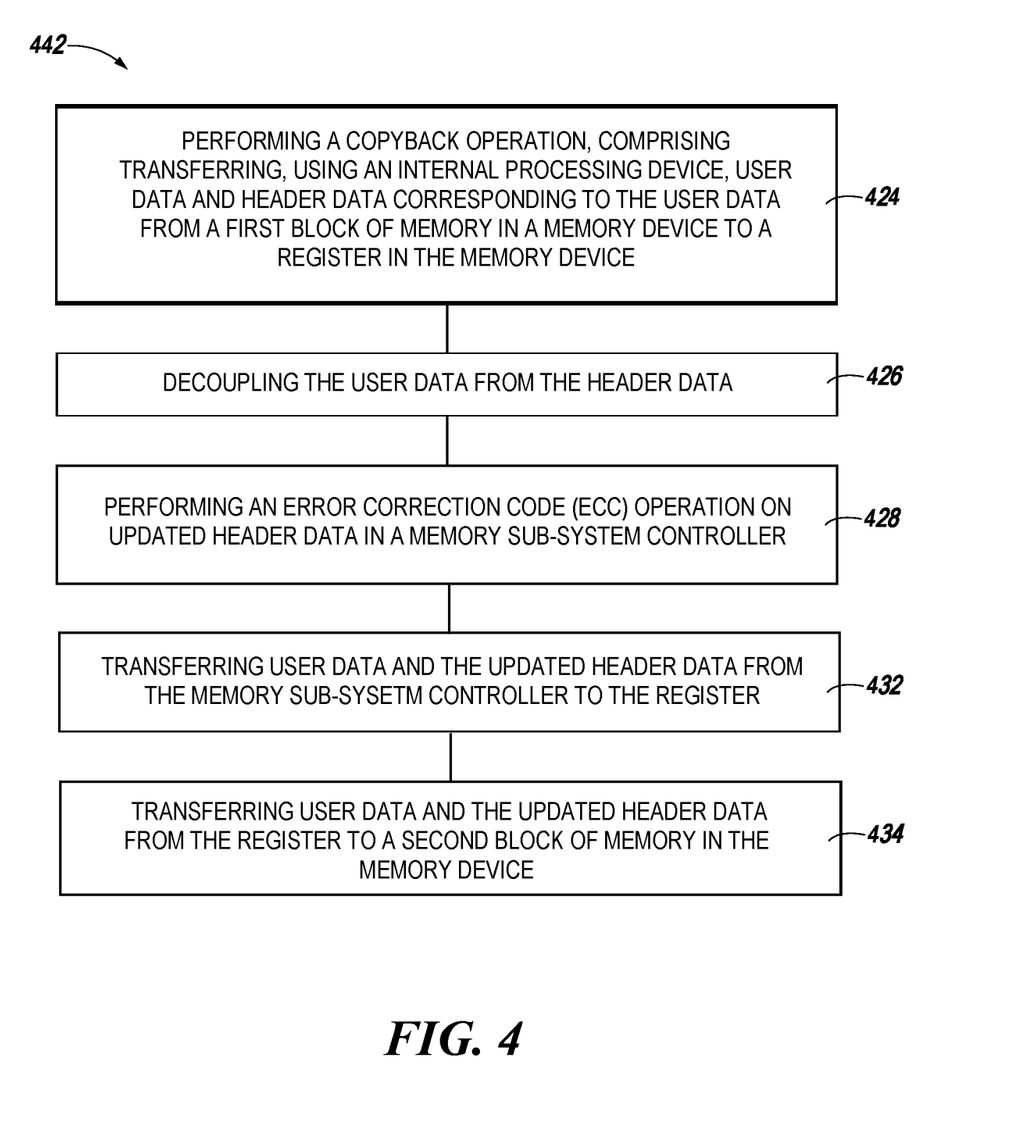
FIG. 4 illustrates a flow diagram of an example method for data management during a copyback operation in accordance with some embodiments of the present disclosure.

FIG. 4 illustrates a flow diagram of an example method 422 for data management during a copyback operation in accordance with some embodiments of the present disclosure. The method 422 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 422 is performed by the memory sub-system controller 104, processing device 107, trigger circuitry 109, memory device 115 and/or 116, and/or local media controller 110 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 424, the method 422 includes performing a copyback operation, including transferring, using an internal processing device, user data and header data corresponding to the user data from a first block of memory in a memory device to a register in the memory device. In some embodiments, the user data and the header data each have separate ECC data corresponding thereto.

At operation 426, the method 426 includes decoupling the user data from the header data. In some embodiments, the user data and the header data can be ECC encoded before the user data and the header data are decoupled. In some embodiments, decoupling the user data and the corresponding header data can allow an ECC operation to be performed on either the user data or the corresponding header data without performing the ECC operation on the other of the user data or corresponding header data. The separate ECC operations can be performed because each of the decoupled user data and header data have their own ECC.

At operation 428, the method 422 includes performing an ECC operation on the updated header data in the memory sub-system controller. The updated header data can have ECC separate from the ECC of the header data and the ECC of the user data. Therefore, an ECC operation can be performed on the updated header data without performing an ECC operation on the header data or the user data.

At operation 432, the method 422 includes transferring updated header data from a memory sub-system controller (e.g., memory sub-system controller 304 shown in FIG. 3) to the register. In some embodiments, the memory device in which the user data and corresponding header data is located (e.g., memory device 315 shown in FIG. 3) does not include ECC circuitry. In these embodiments, the memory sub-system controller will ECC encode the updated header data before sending the updated header data to the register. The header data can be discarded and replaced with the updated header data while the header data and the user data are in the register.

At operation 434, the method 422 includes transferring the user data and the updated header data from the register to a second block of memory in the memory device. The updated header data and the user data can be transferred to the second block of memory as part of a copyback operation without performing an ECC operation on the updated header data and the user data. In some embodiments, the first block of memory and the second block of memory can be different memory types. For example, the first block of memory can include single level cell (SLC) memory that is written at a first temperature and the second block of memory can include non-single level cell (NSLC) memory that is written at a second temperature that is different from the first temperature. In some embodiments, the first temperature and the second temperature can be the same temperature. In some examples, NSLC memory can include, at least, multilevel cell (MLC) memory, triple level cell (TLC) memory, quadruple level cell (QLC) memory, and penta-level cell (PLC) memory.

In some embodiments, the memory sub-system controller may request the updated header data and user data. In these embodiments, the memory device in which the updated header data and the user data is held can transfer the updated header data and the user data to the memory sub-system controller and the memory sub-system controller can decode the updated header data and the user data.

Figure 5:
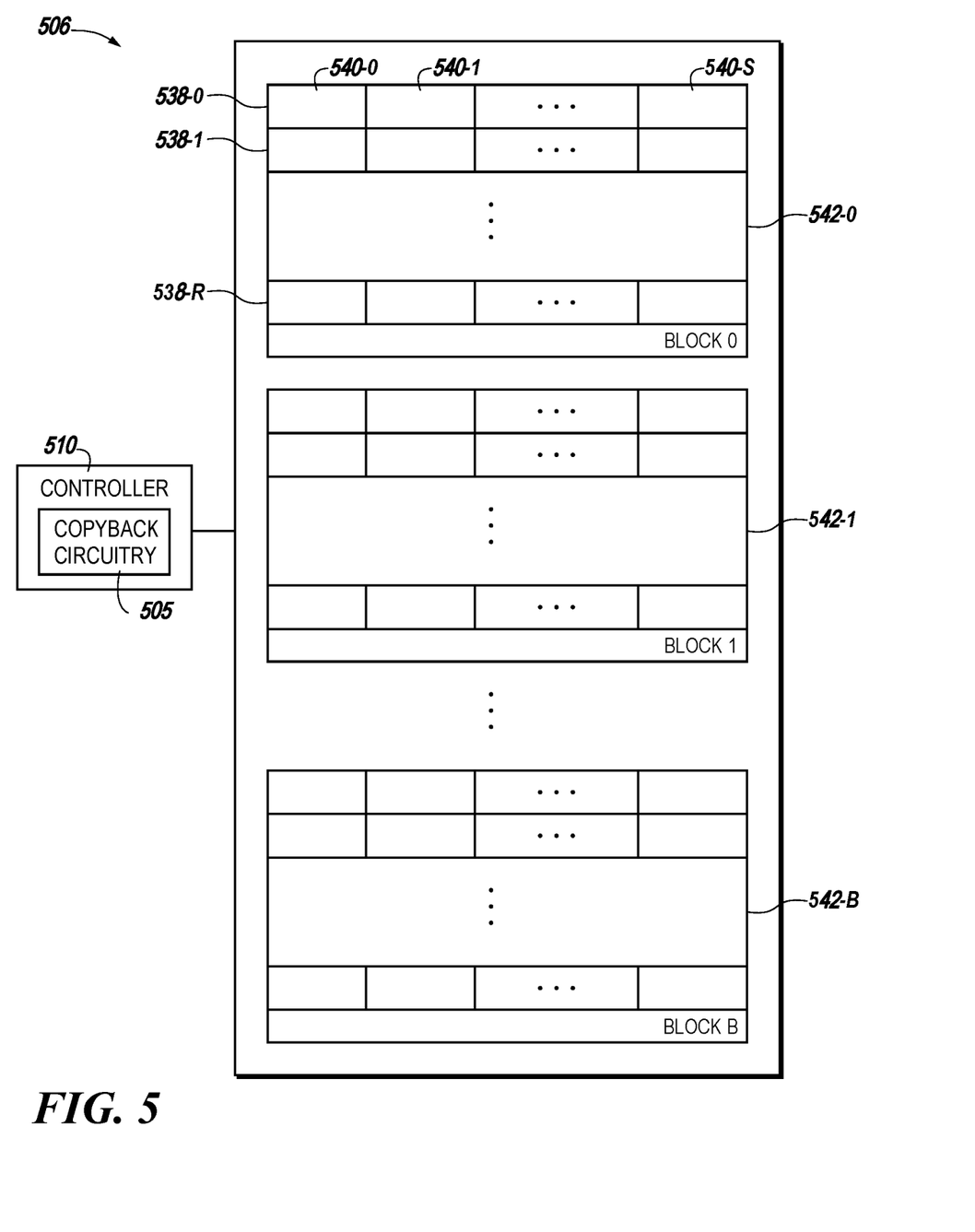
FIG. 5 illustrates a diagram of a portion of a memory array having a number of physical blocks coupled to a controller in accordance with some embodiments of the present disclosure.

FIG. 5 illustrates a diagram of a portion of a memory array 506 having a number of physical blocks 542-0, 542-1, 542-B coupled to a controller 517 in accordance with some embodiments of the present disclosure. The controller 510 can be analogous to the local memory controller 110 illustrated in FIG. 1. The controller 510 can further include copyback circuitry 505 configured to perform copyback operations in accordance with embodiments described herein.

Memory array 506 can be, for example, a NAND flash memory array. As an additional example, memory array 506 can be a storage class memory (SCM) array, such as, for instance, a three-dimensional cross-point memory array, a ferroelectric RAM (FRAM) array, or a resistance variable memory array such as a PCRAM, RRAM, or spin torque transfer (STT) array, among others. Further, although not shown in FIG. 5, memory array 506 can be located on a particular semiconductor die along with various peripheral circuitry associated with the operation thereof.

As shown in FIG. 5, memory array 506 has a number of physical blocks 542-0 (BLOCK 0), 542-1 (BLOCK 1), . . . , 542-B (BLOCK B) of memory cells. The memory cells can be operated and/or programmed according to a particular programming characteristic (e.g., programming mode) as SLCs and/or NSLCs such as, for instance, MLCs, TLCs, or QLCs, and/or PLCs. As an example, the number of physical blocks in memory array 506 can be 128 blocks, 512 blocks, or 1,024 blocks, but embodiments are not limited to a particular power of two or to any particular number of physical blocks in memory array 506.

A number of physical blocks of memory cells (e.g., blocks 542-0, 542-1, . . . , 542-B) can be included in a plane of memory cells, and a number of planes of memory cells can be included on a die. For instance, in the example shown in FIG. 5, each physical block 542-0, 542-1, . . . , 542-B can be part of a single die. That is, the portion of memory array 506 illustrated in FIG. 5 can be a die of memory cells.

As shown in FIG. 5, each physical block 542-0, 542-1, . . . , 542-B includes a number of physical rows (e.g., 538-0, 538-1, . . . , 538-R) of memory cells coupled to access lines (e.g., word lines). The number of rows in each physical block can be 32, but embodiments are not limited to a particular number of rows 538-0, 538-1, . . . , 538-R per physical block. Further, although not shown in FIG. 5, the memory cells can be coupled to sense lines (e.g., data lines and/or digit lines).

As one of ordinary skill in the art will appreciate, each row 538-0, 538-1, . . . , 538-R can include a number of pages of memory cells (e.g., physical pages). A physical page refers to a unit of programming and/or sensing (e.g., a number of memory cells that are programmed and/or sensed together as a functional group). In the embodiment shown in FIG. 5, each row 538-0, 538-1, . . . , 538-R includes one physical page of memory cells. However, embodiments of the present disclosure are not so limited. For instance, in an embodiment, each row can include multiple physical pages of memory cells (e.g., one or more even pages of memory cells coupled to even-numbered sense lines, and one or more odd pages of memory cells coupled to odd numbered sense lines). Additionally, for embodiments including NSLCs, a physical page of memory cells can store multiple pages (e.g., logical pages) of data (e.g., an uppermost page of data and one or more lower pages of data, with each cell in a physical page storing one or more bits towards the uppermost page of data and one or more bits towards respective lower pages of data).

As shown in FIG. 5, a page of memory cells can include a number of physical sectors 540-0, 540-1, . . . , 540-S (e.g., subsets of memory cells). Each physical sector 540-0, 540-1, . . . , 540-S of cells can store a number of logical sectors of data. Additionally, each logical sector of data can correspond to a portion of a particular page of data. As an example, one logical sector of data stored in a particular physical sector can correspond to a logical sector corresponding to one page of data, and the other logical sector of data stored in the particular physical sector can correspond to the other page of data. Each physical sector 540-0, 540-1, . . . , 540-S, can store system and/or user data, and/or can include overhead data, such as error correction code (ECC) data, logical block address (LBA) data, and header data.

Logical block addressing is a scheme that can be used by a host for identifying a logical sector of data. For example, each logical sector can correspond to a unique logical block address (LBA). Additionally, an LBA can also correspond (e.g., dynamically map) to a physical address, such as a physical block address (PBA), that can indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 542-0, 542-1, . . . , 542-B, rows 538-0, 538-1, . . . , 538-R, sectors 540-0, 540-1, . . . , 540-S, and pages are possible. For example, rows 538-0, 538-1, . . . , 538-R of physical blocks 542-0, 542-1, . . . , 542-B can each store data corresponding to a single logical sector which can include, for example, more or less than 512 bytes of data.

Memory devices such as NAND devices and memory arrays 506 in FIG. 5 can be partitioned using addresses to delineate pages, blocks, etc. Operational parameters (e.g., trim settings) such as programming voltages, programming frequency, and/or programming time length (tPROG) can be controlled and/or adjusted according to different partitions and/or partition portions delineated in memory devices and/or memory sub-systems (e.g., 103 in FIG. 1) by addresses.

Figure 6:
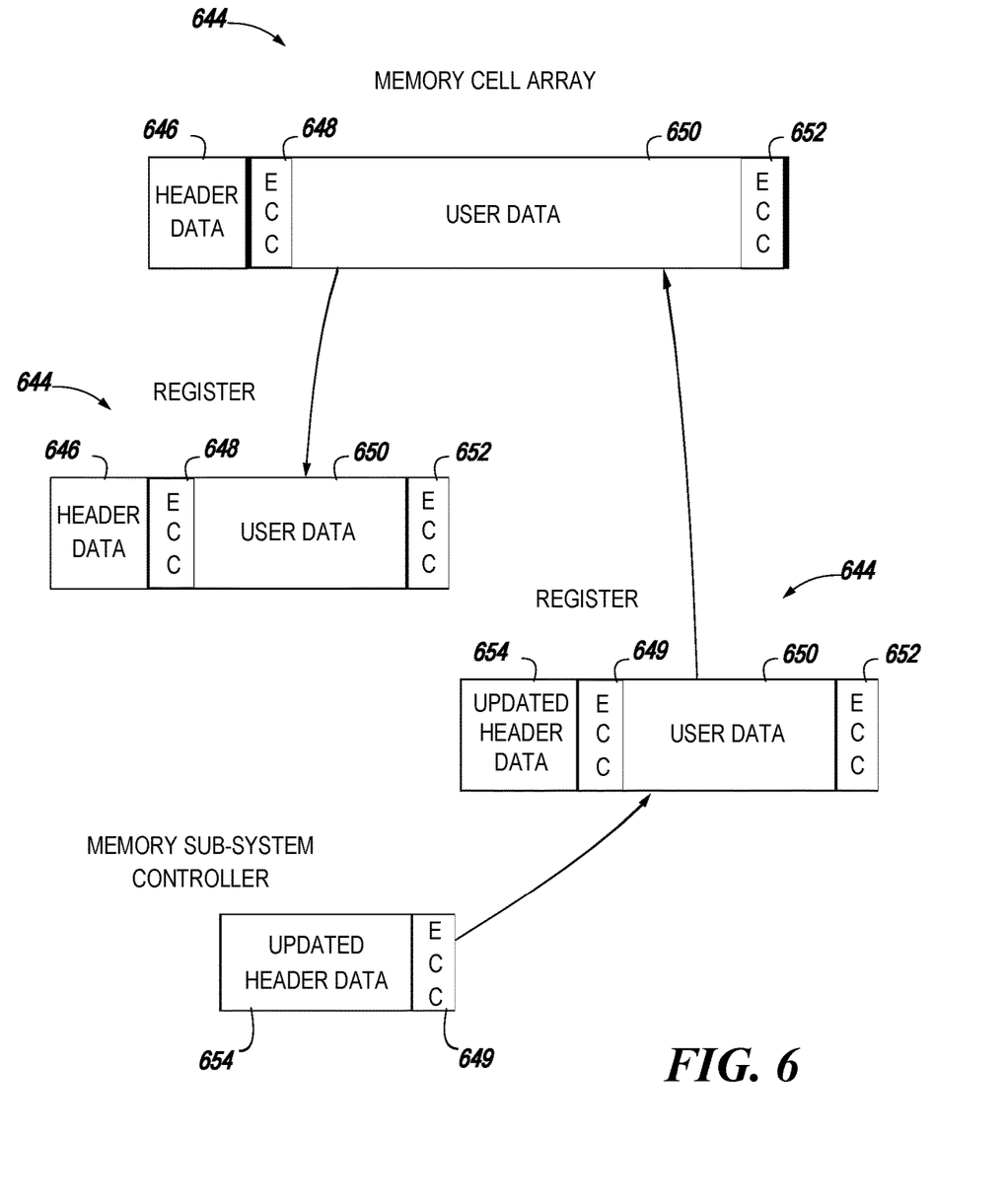
FIG. 6 illustrates an example data structure associated with performing a copyback operation in accordance with some embodiments of the present disclosure.

FIG. 6 illustrates an example data structure associated with performing a copyback operation in accordance with some embodiments of the present disclosure. In the example shown, a data unit 644 in a memory cell array of a memory device includes header data 646, header data ECC 648, user data 650, and user data ECC 652. The data unit 644 may be referred to as a "codeword" 644. As a part of a copyback operation, the data unit 644 can be transferred from a memory cell array in the memory device to the register in the memory device. A memory sub-system controller may send updated header data 654 and updated header data ECC 649 to the register while the user data 650 and the header data 646 are in the register. The header data 646 and header data ECC 648 may be decoupled from the user data, discarded, and replaced with the updated header data 654 and the updated header data ECC 649. The data unit 644 can be transferred from the register back to the memory cell array.

In some embodiments, the header data 646 can be time-variant data and the user data 650 can be time-invariant data. As stated above, the term "time-variant data" can refer to data that changes as ambient conditions around the data change over time. For example, time-variant data can include, at least, a time at which the data is written and a temperature at which the data is written. The time at which the data is written can be time-variant data because the value for the time at which the data is written changes based on the time at which the data is written. The temperature at which the data is written can be time-variant data because the value for the temperature at which the data is written changes based on the temperature of the memory device at the time that the data is being written.

In some embodiments, an internal processing device (e.g., internal processing device 317 as shown in FIG. 3) may move a data unit 644 from a memory cell array (e.g., memory cell array 306 as shown in FIG. 3) in an internal memory device to a register (e.g., register 318 as shown in FIG. 3) in the internal memory device in association with a copyback operation. A memory sub-system controller (e.g., memory sub-system controller 304 as shown in FIG. 3) may send updated header data 654 and updated header data ECC 649 to the register while the data unit 644 is in the register. In some embodiments, the memory sub-system controller may perform an ECC operation on the updated header 654 data to ECC encode the updated header data 654 before sending the updated header data 654 to the register in the internal memory device. The memory sub-system controller may perform the ECC operation on the updated header data 654 using ECC circuitry on the memory sub-system controller. The header data 646 and header data ECC 648 may be decoupled from the user data 650, discarded, and replaced with the updated header data 654 and updated header data ECC 649 while the data unit 644 is in the register. The data unit 644 may be moved from the register to the memory cell array.

In some embodiments, instead of the memory sub-system controller performing the ECC operation on the updated header data 654, the internal memory device will perform the ECC operation on the updated header data 654. In these embodiments, as described above, the memory sub-system controller sends updated header data 654 to the register in the internal memory device while the data unit 644 is in the register. In this embodiment, ECC circuitry on the internal memory device performs an ECC operation on the updated header data 654 to ECC encode the updated header data 654 (e.g., with updated header data ECC 649). The header data 646 and header data ECC 648 are decoupled from the user data 650, discarded, and replaced with the updated header data 654 and updated header data ECC 649. The updated header data 654, updated header data ECC 649, user data 650 and user data ECC 652 are written from the register to the memory cell array internal to the memory device. In some embodiments, if the memory sub-system controller requests the user data 650, the internal memory device will decode the ECC encoded updated header data 654 before sending the updated header data 654 and the user data 650 from a destination block in the memory cell array to the memory sub-system controller.

Figure 7:
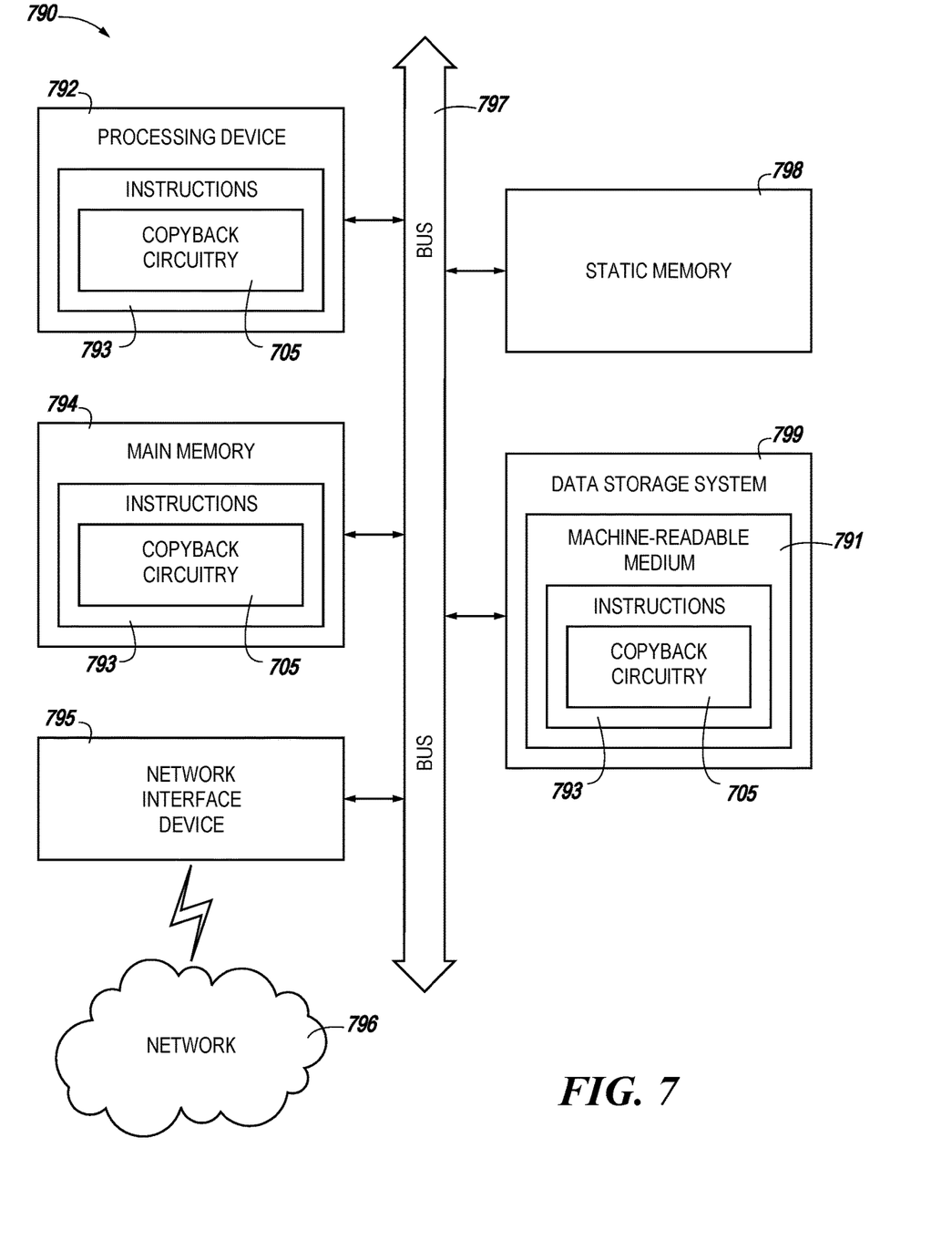
FIG. 7 is a block diagram of an example computer system in which embodiments of the present disclosure may operate.

FIG. 7 illustrates an example machine of a computer system 790 within which a set of instructions, for causing the machine to perform one or more of the methodologies discussed herein, can be executed. In some embodiments, the computer system 790 can be analogous to the memory sub-system controller 104 of FIG. 1. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or another machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the methodologies discussed herein.

The example computer system 790 includes a processing device 792, a main memory 794 (e.g., read-only memory (ROM), flash memory, dynamic random access memory (DRAM) such as synchronous DRAM (SDRAM) or resistive DRAM (RDRAM), etc.), a static memory 798 (e.g., flash memory, static random access memory (SRAM), etc.), and a data storage system 799, which communicate with each other via a bus 797.

The processing device 792, which can be analogous to the external processing device 107 in FIG. 1, represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 792 can also be one or more special-purpose processing devices such as an application specific integrated circuit (ASIC), a field programmable gate array (FPGA), a digital signal processor (DSP), network processor, or the like. The processing device 792 is configured to execute instructions 793 for performing the operations and steps discussed herein. The computer system 790 can further include a network interface device 795 to communicate over the network 796.

The data storage system 799 can include a machine-readable storage medium 791 (also known as a computer-readable medium) on which is stored one or more sets of instructions 793 or software embodying one or more of the methodologies or functions described herein. The instructions 793 can also reside, completely or at least partially, within the main memory 794 and/or within the processing device 792 during execution thereof by the computer system 790, the main memory 794 and the processing device 792, also constituting machine-readable storage media. The machine-readable storage medium 791, data storage system 799, and/or main memory 794 can correspond to the memory sub-system 103 of FIG. 1.

In one embodiment, the instructions 793 include instructions to implement functionality corresponding to copyback circuitry (e.g., copyback circuitry 105 of FIG. 1). The copyback circuitry may be associated with a copyback operation in which data from a source block of memory is moved to a destination block of memory without performing an ECC operation on the data. During the copyback operation, a memory sub-system controller may send updated header data to a register in an internal memory device that holds user data and corresponding header data. The header data may be decoupled from the user data, discarded, and replaced with the updated header data. The updated header data and the user data may be sent from the register in the internal memory device to the memory cell array in the internal memory device. In some embodiments, the updated header data is ECC encoded by the memory sub-system controller before the updated header data is sent to the register. In some embodiments, the updated header data is ECC encoded by the internal processing device while the updated header data is in the register.

While the machine-readable storage medium 791 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
performing a copyback operation, comprising:
  transferring, using an internal processing device, user data and header data corresponding to the user data from a first block of memory in a memory device to a register in the memory device;
  decoupling the user data from the header data while the user data and the header data are in the register;
  transferring, via an external processing device, updated header data and updated header data error correction code (ECC) data to the register while the header data and user data are in the register, wherein:
    the updated header data, the header data, and the user data each have separate, corresponding ECC data;
    the header data is updated without sending the header data from the register to the external processing device;
    an ECC operation is performed on the updated header data by the external processing device before the updated header data is transferred to the register; or
    the ECC operation is performed on the updated header data by the internal processing device after the updated header data is transferred to the register;
  discarding the header data;
  replacing the header data with the updated header data; and
  transferring the user data and the updated header data from the register to a second block of memory in the memory device.

2. The method of claim 1, wherein the first block of memory is a block of single level cell (SLC) memory that is written at a first temperature and the second block of memory is a different block of memory that is written at a second temperature that is different than the first temperature.

3. The method of claim 1, wherein the user data and the header data are ECC encoded before they are decoupled.

4. The method of claim 1, wherein the user data and the header data are ECC encoded after they are decoupled.

5. The method of claim 1, further comprising updating the header data without sending the user data or the header data from the memory device to the external processing device.

6. The method of claim 1, wherein the header data and the updated header data include time-variant data.

7. A system, comprising:
a memory device comprising an internal processing device coupled to a memory array; and
an external processing device coupled to the memory device, wherein the memory device is configured to, in association with performing a copyback operation:
read user data and corresponding header data from a source block of the memory array;
transfer the user data and the corresponding header data from the source block of the memory array to a register;
decouple the user data from the header data while the user data and the header data are in the register;
receive updated header data and updated header data error correction code (ECC) data corresponding to the user data from the external processing device while the user data and header data are in the register, wherein:
the updated header data, the header data, and the user data each have separate, corresponding ECC data;
the header data is updated without sending the header data from the register to the external processing device;
an ECC operation is performed on the updated header data by the external processing device before the updated header data is transferred to the register; or
the ECC operation is performed on the updated header data by the internal processing device after the updated header data is transferred to the register; and
discard the header data;
replace the header data with the updated header data; and
program the user data and corresponding updated header data to a destination block of the memory array.

8. The system of claim 7, wherein the external processing device is a memory sub-system controller.

9. The system of claim 7, wherein the memory device is configured to, responsive to a read command received from the external processing resource subsequent to the copyback operation:
read the user data and the corresponding updated header data from the destination block of the memory array; and
provide the user data and the corresponding updated header data to the external processing device without performing the ECC operation on the user data or the corresponding updated header data.

10. The system of claim 7, wherein the system includes trigger circuitry to signal the external processing device responsive, at least in part, to a determination that a trigger event has occurred and the copyback operation is performed responsive to the determination that the trigger event has occurred.

11. The system of claim 7, wherein the header data is time-variant data and the user data is time-invariant data.

12. The system of claim 7, wherein the external processing device decodes the updated header data using ECC circuitry in response to receiving the user data and corresponding updated header data.

13. A system, comprising:
an external processing device; and
a memory device coupled to the external processing device, the memory device comprising:
a cyclic buffer partition portion having a first endurance characteristic and a first reliability characteristic associated therewith;
a snapshot partition portion coupled to the cyclic partition portion via hold-up capacitors, the snapshot partition portion having a second endurance characteristic and a second reliability characteristic associated therewith; and
an internal processing device configured to perform, in response to a trigger event, a copyback operation, including:
transferring user data and header data corresponding to the user data from the cyclic buffer partition portion to a register;
decoupling the user data from the header data while the user data and header data are in the register;
receiving updated header data and updated header error correction code (ECC) data from the external processing device, wherein the header data is updated without sending the header data from the register to the external processing device;
discarding the header data;
replacing the header data with the updated header data;
performing an ECC operation on the updated header data; and
transferring the user data and the updated header data to the snapshot partition portion.

14. The system of claim 13, wherein the system is an autonomous vehicle and the trigger event is a mechanical stress above a threshold as detected by a sensor on the autonomous vehicle.

15. The system of claim 13, wherein the internal processing device is configured to, based at least in part on a determination that the trigger event has occurred, perform the copyback operation to write at least 30 seconds of data from the cyclic buffer partition portion to the snapshot partition portion, wherein the snapshot partition portion has a size to store at least 8 different sets of at least 30 seconds of received data.

16. The system of claim 13, wherein the first endurance characteristic is greater than the second endurance characteristic and the first reliability characteristic is less than the second reliability characteristic.

* * * * *